US010109093B2

(12) United States Patent
Peterson

(10) Patent No.: US 10,109,093 B2
(45) Date of Patent: Oct. 23, 2018

(54) AUTOMATIC CROP AND FILL BOUNDARY GENERATION

(71) Applicant: Adobe Systems Incorporated, San Jose, CA (US)

(72) Inventor: John Peterson, Menlo Park, CA (US)

(73) Assignee: Adobe Systems Incorporated, San Jose, CA (US)

( * ) Notice: Subject to any disclaimer, the term of this patent is extended or adjusted under 35 U.S.C. 154(b) by 141 days.

(21) Appl. No.: 15/166,221

(22) Filed: May 26, 2016

(65) Prior Publication Data
US 2017/0345193 A1 Nov. 30, 2017

(51) Int. Cl.
G06K 9/48 (2006.01)
G06T 11/60 (2006.01)
G06T 7/00 (2017.01)
G06T 3/60 (2006.01)
G06T 11/80 (2006.01)
G06F 3/0484 (2013.01)

(52) U.S. Cl.
CPC .......... G06T 11/60 (2013.01); G06F 3/04845 (2013.01); G06T 3/60 (2013.01); G06T 7/004 (2013.01); G06T 7/0085 (2013.01); G06T 11/80 (2013.01)

(58) Field of Classification Search
CPC . G06T 11/60; G06T 11/80; G06T 3/60; G06F 3/04845
See application file for complete search history.

(56) References Cited

U.S. PATENT DOCUMENTS

| 6,271,935 B1* | 8/2001 | Cook | H04N 1/38 358/1.18 |
| 8,423,883 B1* | 4/2013 | Stockmann | G09G 3/003 345/549 |
| 2007/0285561 A1* | 12/2007 | Chen | H04N 1/2112 348/373 |
| 2009/0009613 A1* | 1/2009 | Chien | H04N 5/23248 348/208.1 |
| 2014/0333722 A1* | 11/2014 | Kim | H04N 13/0022 348/46 |

FOREIGN PATENT DOCUMENTS

GB 2527033 * 12/2015

OTHER PUBLICATIONS

Gunther Greiner et al., "Efficient Clipping of Arbitrary Polygons" dated Apr. 1998, 13 pages, ACM Transactions on Graphics, vol. 17, No. 2.

* cited by examiner

Primary Examiner — Samir Ahmed
(74) Attorney, Agent, or Firm — Brake Hughes Bellermann LLP

(57) ABSTRACT

A system and method for extending bounds of straightened and enlarged images is described. A user interface of an image editing application exposes an image to a user for editing. The user positions the image in the user interface and the image editing application generates a frame in the user interface to identify boundaries of a final image in the user interface. The image editing application then automatically determines an empty area within the frame, applies a fill operation to the empty area within the frame, and updates the image in the user interface to reflect results of the fill operation.

16 Claims, 13 Drawing Sheets

AUTOMATIC CROP AND FILL BOUNDARY GENERATION

BACKGROUND

Digital image editing has become increasingly more popular as digital capture devices have become somewhat ubiquitous. An individual, for instance, may carry a mobile phone, dedicated camera, or the like that the individual can utilize to capture digital images of scenes (e.g., landscape, room, sporting event, etc.) that are of interest. In some instances, these digital images do not capture the scene as desired (e.g., due to the camera not being held level, perspective distortion, etc.). In such instances, a user can modify the digital image to achieve a desired result using digital image editing techniques. Some of these digital image editing techniques utilize rotate, crop, or other techniques to align the scene as desired. The techniques may include rotating and cropping an image to produce a "cropped" image that aligns the scene as desired. However, during the cropping process, desirable portions of the image may be lost from the image. Further, traditional image editing applications provide manual cropping and rotating workflows in which a user may have to perform multiple steps to align an image and select crop boundaries to produce a desired output image.

SUMMARY

The techniques introduced herein overcome the deficiencies and limitations of the prior art, at least in part, with a system and method for extending bounds of straightened and enlarged images is described. The techniques include exposing an image for editing in a user interface of an image editing application. The techniques further include receiving input indicating a positioning of the image in the user interface and a frame in the user interface to identify boundaries of a final image relative to the image for editing. Responsive to the input, the techniques additionally include automatically determining an empty area within the frame and applying a content aware fill operation to the empty area within the frame. The techniques may also include updating the image in the user interface to reflect results of the content aware fill operation.

Other aspects include corresponding methods, systems, apparatuses, and computer program products for these and other innovative aspects.

The features and advantages described herein are not all-inclusive and many additional features and advantages will be apparent in view of the figures and description. Moreover, it should be noted that the language used in the specification has been principally selected for readability and instructional purposes and not to limit the scope of the techniques described.

BRIEF DESCRIPTION OF THE DRAWINGS

The techniques introduced herein are illustrated by way of example, and not by way of limitation in the figures of the accompanying drawings in which like reference numerals are used to refer to similar elements.

DETAILED DESCRIPTION

Figure 1:
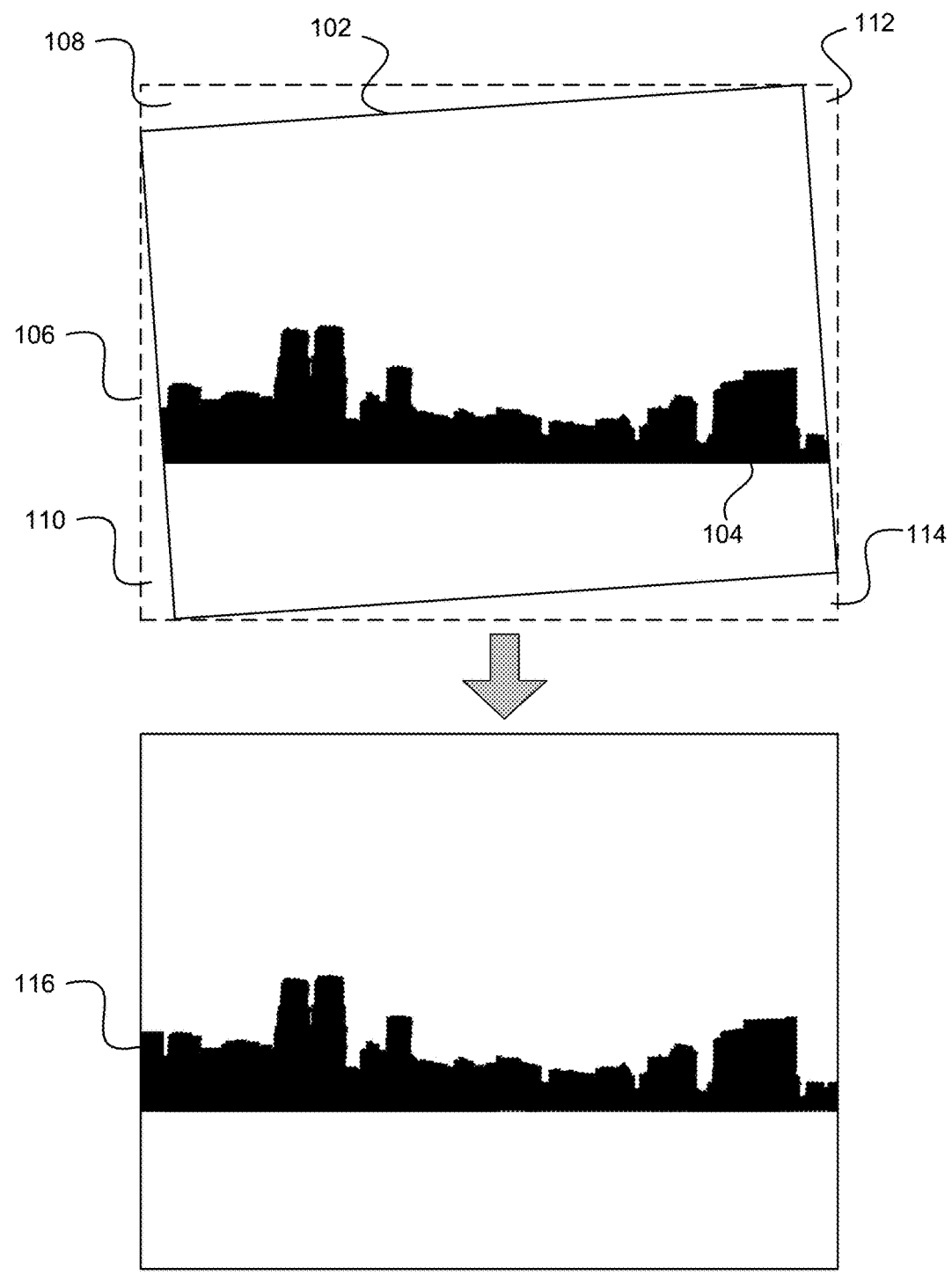
FIG. 1 is an example diagram depicting an auto fill on rotate operation according to embodiments of the techniques disclosed herein.

While existing techniques allow users to rotate an image (e.g., a photograph) to straighten or align the contents of the image, the rotated image no longer fits in a horizontal rectangle and by the original image. One solution according to the existing techniques is to crop the image to a smaller rectangle that fits within the rotated image. With this approach, however, a substantial amount of the original image is removed. In contrast, the techniques disclosed herein allow user to rotate the image while automatically determining empty areas outside of the image to be filled using a content aware fill operation, such that none of the original image is lost. Further, the disclosed techniques provide for automatically extending a frame as the user rotates the image to define the empty areas to be filled. The disclosed techniques, therefore, advantageously provide a simple solution for aligning an image without losing content included in the original image.

In at least some embodiments, the disclosed techniques provide for a user interface allowing a user to select an option for automatically filling empty areas around an image when the image is rotated. For example, an option to apply a combined rotate and fill operation may be exposed as a menu item, a tool bar selection, or the like. The option for the combined rotate and fill operation may be presented individually or in combination with other available options, such as a simple crop (e.g., without fill) option, and a cancel option. The option to apply a combined rotate and fill may be selectable to initiate a sequence of operations to automatically determine empty areas to fill, apply a content aware fill operation to the empty areas, and produce a resulting output image. Accordingly, when the option for the combined rotate and fill is selected, multiple operations are performed automatically to generate an edited output image without further action on the part of the user.

Additionally, the user interface exposes the original image for editing to the user and, in response to user input, displays a frame defining the empty areas around the image to be filled. The user interface dynamically updates the image and the frame as the user rotates the image. For example, the frame tracks the corners of the original image as the user rotates the image. In this way, unlike with previous techniques, no information from the original image is lost and the user does not need to define areas to be filled by the content aware fill operation.

In some embodiments, the user interface allows the user to define a frame relative to the original image that may include empty areas to be filled by the content aware fill operation. For example, a user can define a particular aspect ratio of the final image that extends beyond the boundaries of the original image, and therefore leaves empty areas to be filled by the content aware fill operation. In another example, the user can select to crop a portion of the original image and extend another portion of the original image (e.g., to reframe an object in the image) using the content aware fill operation to fill empty areas created in the extended portion. In such embodiments, the disclosed techniques automatically determines the empty areas surrounding the original image to be filled by the content aware fill operation, even if the empty areas surrounding the original image are irregularly shaped.

FIG. 1 is an example diagram depicting an auto fill on rotate operation. The example of FIG. 1 includes an image 102 captured by a user with the camera held at an angle to the horizon. To correct the horizon line in the image 102, the user loads the image 102 into an image editing application and rotates the image 102 in the user interface of the image editing application such that the horizon line 104 is horizontal. As the user rotates the image 102, the image editing application generates a frame 106, visible to the user in the user interface, that defines empty areas around the image 102 (e.g., empty areas 108, 110, 112, and 114) to be filled with a fill operation (e.g., a content aware fill operation) and identify boundaries of a final image relative to the image 102. When the user is satisfied with the location and orientation of the image 102 (e.g., the user selects a "fill" option, stops rotating the image, etc.), the image editing application uses the fill operation to generate the updated image 116 by filling in the empty areas 108, 110, 112, and 114 created between the image 102 and the frame 106. In some embodiments, the image editing application may continuously fill the empty areas using the fill operation to provide the user with a preview of the image 116 while the user is rotating the image.

Figure 2:
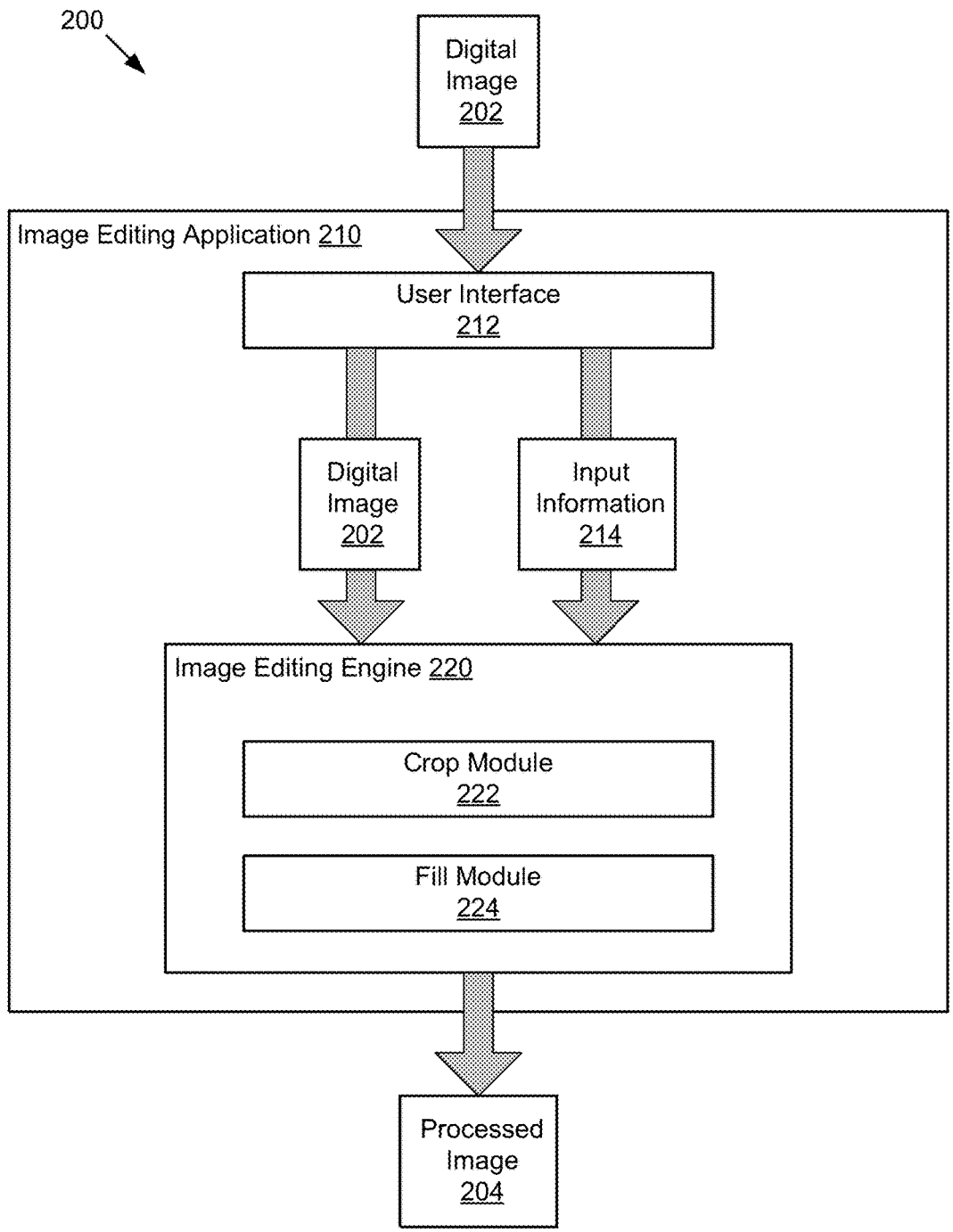
FIG. 2 is a block diagram depicting an example image editing environment according to embodiments of the techniques disclosed herein.

FIG. 2 is a block diagram depicting an example image editing environment 200 according to embodiments of the techniques disclosed herein. As depicted, the image editing environment 200 includes an image editing application 210. Image editing application 210 can be any suitable image or graphics editor, such as, for example, ADOBE® Illustrator or ADOBE® Photoshop (both available from Adobe Systems Inc. of San Jose, Calif.). Image editing application 210 can be configured to provide, among other things, a user interface that facilitates a user of the image editing application 210 in manipulating a digital image, such as, for example, digital image 202.

Digital image 202 represents an image that is stored in a digital format (e.g., JPEG, BMP, TIFF, PNG, GIF, etc.). Digital image 202 can be stored digitally as a two-dimensional array of pixels depicting the object or scene captured by a digital capture device. Each of these pixels is assigned certain information, such as, for instance, color information. The pixel information can be used by a fill operation to generate additional pixels to fill in an empty area as described herein. In various embodiments, digital image 202 can be produced, or captured, by a digital image capture device. Such a digital image capture device could be, for example, a document scanner, a digital camera (video or still), or any other suitable digital image capture device. In other embodiments, digital image 202 may be produced entirely in the digital realm (e.g., computer generated imagery (CGI)).

The image editing application 210 includes a user interface 212 (e.g., a graphical user interface). In some embodiments, user interface 212 is configured to facilitate a user of the image editing application 210 in performing digital image editing techniques (e.g., crop, rotate, etc.) on digital image 202. To accomplish this, user interface 212 can be configured to display digital image 202 to the user and to accept input information 214 from the user with respect to the digital image. As an example, the user may utilize user interface 212, in conjunction with an input device (e.g., touch sensors, stylus, mouse, etc.), to rotate the digital image 202 or define a frame corresponding to the boundaries of the final processed image 204. The frame can extend beyond the boundaries of the digital image 202 and the image editing application 210 fills the empty area extending beyond the digital image 202 with synthesized image data that is assembled from a source region of the digital image 202 (e.g., an area in the digital image 202 adjacent to the empty area).

To accomplish the digital image editing techniques, image editing application 210 includes image editing engine 220. Image editing engine 220 can take digital image 202 and the input information 214 as input. In some embodiments, image editing engine 220 can include a crop module 222 and a fill module 224. In various embodiments, these modules may work in conjunction to perform crop and fill operations as described herein.

The crop module 222 is configured to crop the area from digital image 202 indicated by the input information 214 from the frame manipulated by the user in user interface 212. In some embodiments, the crop module 222 clips the digital image 202 against the frame using a generalized polygon clipping algorithm. For example, the crop module 222 may use the algorithm described by Greiner and Hormann in *Efficient Clipping of Arbitrary Polygons*, ACM Transactions on Graphics, 17(2) April 1998, p. 71-83. However, it should be understood that the crop module 222 may use other generalized clipping algorithms. These generalized clipping algorithms tend to break down in certain cases, such as, when a vertex of one rectangle (e.g., digital image 202) lies exactly on the edge of another (e.g., the frame in user interface 212), or when the edges of two rectangles are coincident. The techniques described herein address these particular cases by treating crop and fill operations into three particular cases where a generalized clipping algorithm is not used, described in detail below with reference to FIGS. 4-6.

The fill module 224 is configured to fill empty areas created between the frame in user interface 212 and the digital image 202 using a fill operation. A variety of different algorithms and techniques for the fill operation are contemplated. In general, the fill module 224 uses a content aware fill operation that relies upon pixels in source areas in the digital image to determine how to fill the empty areas. This may involve examining content within the image in the source areas, sampling pixels from the source areas, and reproducing the sampled pixels in the empty areas. Areas may be progressively filled from the edge of the digital image outward to the frame define by the user in user interface 212.

In one embodiment, the fill module 224 uses a patch synthesis technique for the content aware fill operation. The patch synthesis technique includes finding one or more patches (e.g., source areas) of the digital image that can be utilized by the fill module 224 in filling the empty areas. As used herein, a patch can refer to an area, section, or grouping, of pixels in a digital image. This section may be of fixed or varying shape. For example, a patch may be defined as a fixed shape 5×5 or 7×7, where the dimensions indicate the number of pixels covered by the patch (e.g., a 7×7 patch covers an area of 7×7 pixels, or a total of 49 pixels). Each patch can be centered at a single pixel and can overlap patches centered at neighboring pixels. Thus a number of overlapping patches can cover each pixel. For example, considering a patch of dimensions 7×7, each pixel would be covered by a total of 49 overlapping patches.

The patch synthesis technique may include searching the digital image for source patches that correspond with a destination patches that lie within the empty areas using an iterative search method. In embodiments, this iterative search can take the form of an approximate nearest-neighbor search. Examples of approximate nearest neighbor searches include, patch matching based searches (e.g., PatchMatch), hashing based searches (e.g., coherency sensitive hashing (CSH)), tree based searches (e.g., kd-tree), or any other suitable approximate nearest-neighbor search. The PatchMatch algorithm may be, for example, the algorithm disclosed by Barnes, Shechtman, Finkelstein & Goldman, *PatchMatch: A Randomized Correspondence Algorithm for Structural Image Editing* ACM Transactions on Graphics (Proc. SIGGRAPH), August 2009.

Once corresponding patches have been found, the fill module 224 can begin to be fill the empty areas through a voting process that determines a color of each pixel within the empty areas utilizing these corresponding patches. This can be accomplished through a blending operation that takes into account the patches that overlap a single pixel to assign a color to that single pixel. This process can be repeated many times to progressively find better corresponding patches and thereby result in a better fill for the empty areas. Once the image editing engine 220 has completed the image editing technique, the resulting processed image 204 can be output (e.g., to a display, printer, etc.).

Figure 3:
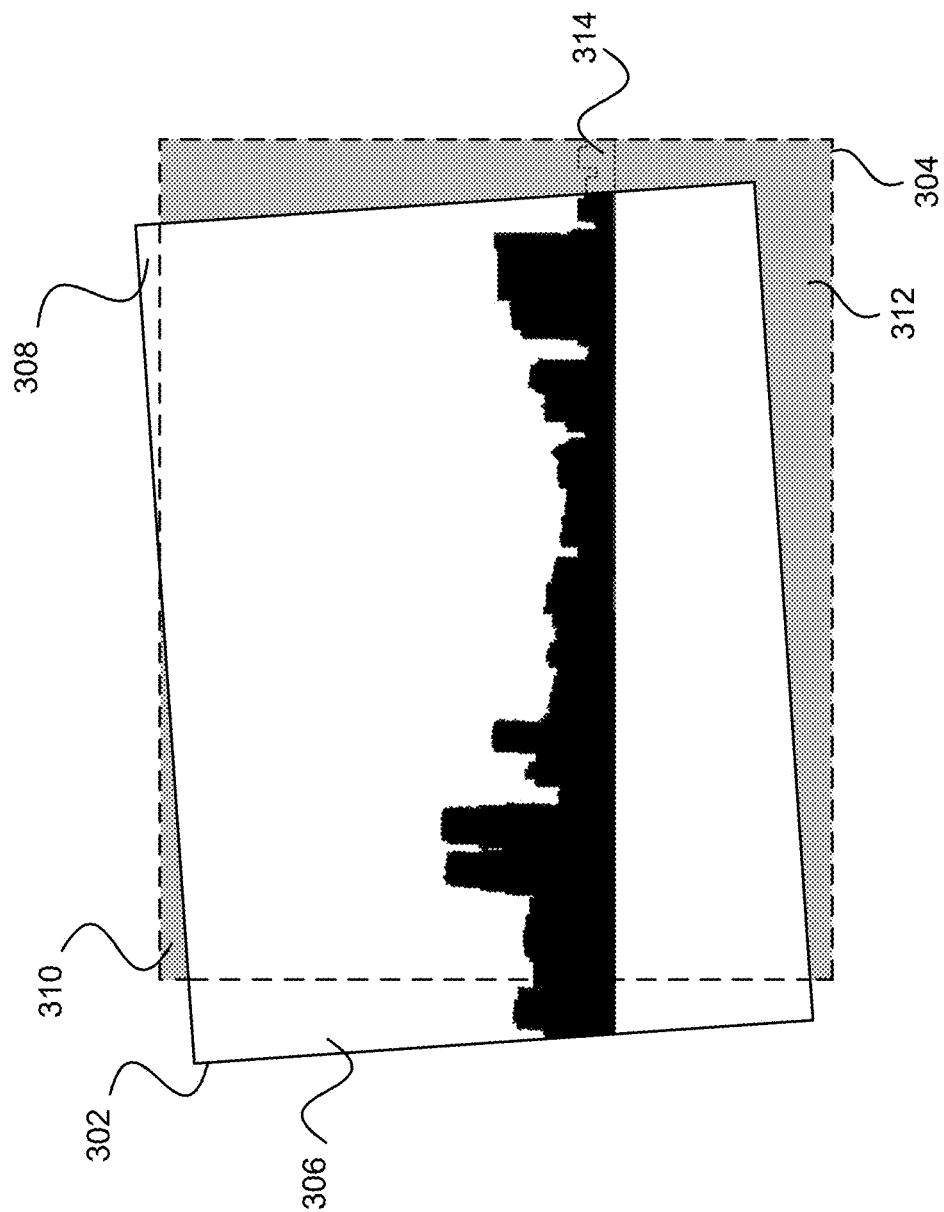
FIG. 3 is an example diagram depicting crop and fill on rotate operation according to embodiments of the techniques disclosed herein.

FIG. 3 is an example diagram depicting crop and fill on rotate operation. In some embodiments, the user rotates the image 302 and adjusts the frame 304 as depicted in the example of FIG. 3. In such scenarios, the image editing engine completes both a crop and fill operation based on the location of input from the user in user interface 212 indicating rotation of the image 302 and the location of the frame 304. The crop module 222 crops sections from the image 302 (e.g., sections 306 and 308) that fall outside of the frame 304 set by the user. In the general case, where a rotated image is cropped to an area at arbitrary locations (e.g., as depicted in the example of FIG. 3), the crop module 222 uses a general clipping algorithm to crop the sections of the image 302 that fall outside of the frame 304 and define a fill polygon for the empty areas between image 302 and frame 304. Additionally, the fill module 224 fills the empty areas between the image 302 and the frame 304 (e.g., empty areas 310 and 312) depicted as the grey area in the example of FIG. 3. To define the empty areas, the crop module 222 uses the general clipping algorithm to generate fill polygons 310 and 312 that are between the image 302 and the frame 304. The fill module 224 then fills uses a content aware fill operation to fill the fill polygons with pixels sampled from the image 302, as depicted by the dotted outline 314. In some embodiments, the crop module 222 extends the fill polygon to slightly overlap with image 302. This extension provides for better coverage of the empty area, as there may be a slight line detectable when the fill polygon does not overlap the image 302.

Figure 4:
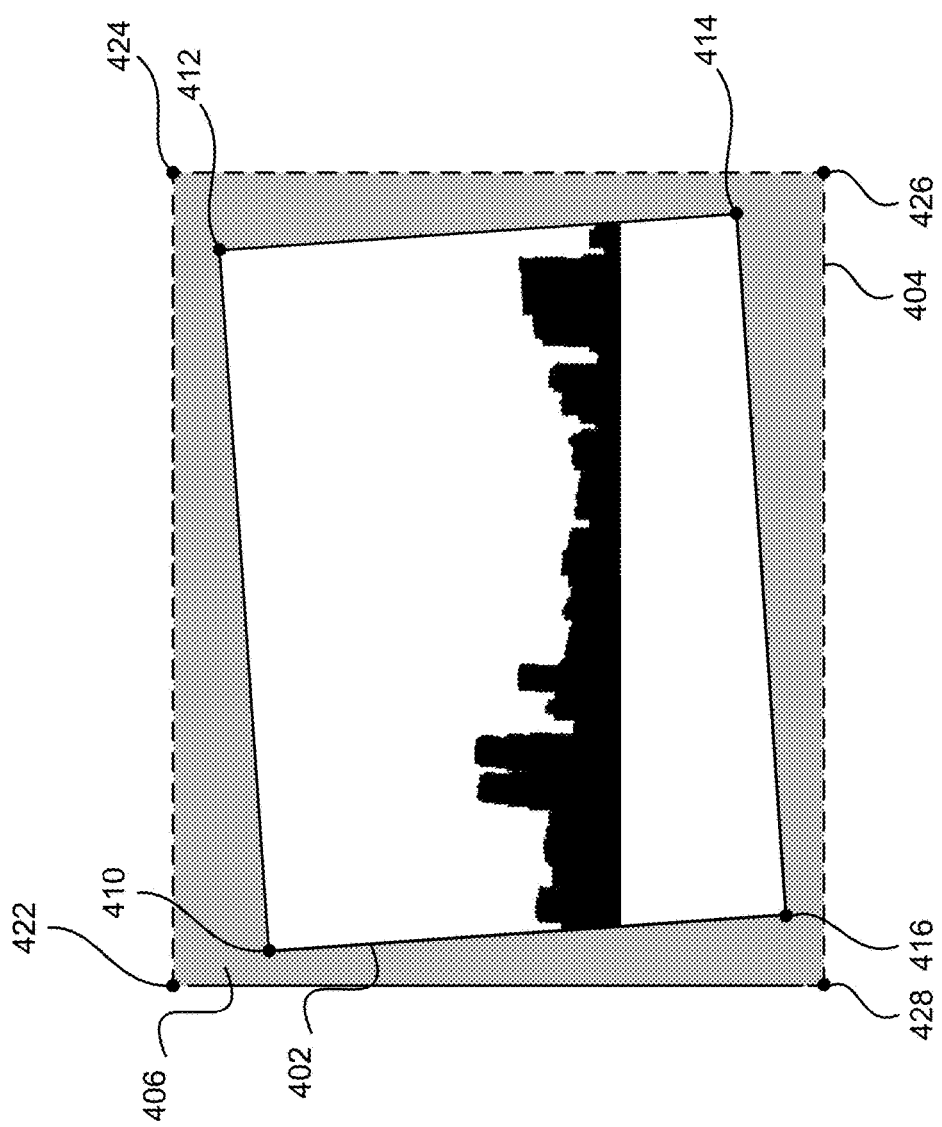
FIG. 4 is an example diagram depicting a fill on rotate operation where the image is enclosed completely in the frame according to embodiments of the techniques disclosed herein.

FIG. 4 is an example diagram depicting a fill on rotate operation where the image 402 is enclosed completely in the frame 404. While in some cases, such as the case described below with reference to FIG. 5, the boundaries of the frame may track the corners of the rotated image, the user in this case may have desired a particular aspect ratio for the image or to place an object in the image at a particular location in the processed image and therefore manipulated the frame 404 separately from the rotation of the image 402. In one embodiment, the crop module 222 generates a single fill polygon 406 to be filled using the corners of image 402 and frame 404 based on a winding number fill algorithm. The outside of the fill polygon (e.g., points corresponding to the corners of frame 404) is generated by adding the location of corners of the frame 404 to a point array defining the polygon while stepping around the frame 404 in one direction and the inside of the fill polygon (e.g., points corresponding to the corners of image 402) is generated by adding the location of corners of the image 402 to the point array while stepping around the image 402 in the opposite direction as the frame 404.

For example, the crop module 222 identifies and stores the location of corners of the image 402, starting at corner 410 and working in a clockwise manner, in the point array (e.g., [410, 412, 414, 416]). The crop module 222 then reverses the order of the stored corner locations in the point array, and adds a copy of the first element of the reversed array to the end of the point array (e.g., [416, 414, 412, 410, 416]). The reversal of the order of the stored corner locations in the point array creates an inner portion of the polygon that flows in an opposite direction to the outer portion of the polygon (described below) that works with the winding number fill algorithm. In some embodiments, the crop module 222 simply identifies and stores the corner locations in the point array in one order (e.g., counterclockwise) and does not need to reverse the order after adding the corner locations in the point array.

The crop module 222 continues generating the polygon by identifying and storing the location of corners of the frame 404, starting at corner 422 and working in a clockwise manner, in a temporary frame point array (e.g., [422, 424, 426, 428]). The crop module 222 concatenates the corner locations in the temporary frame point array to the point array containing the image corners (e.g., [422, 424, 426, 428, 416, 414, 412, 410, 416]) and adds a copy of the fourth and first elements to the point array (e.g., [422, 424, 426, 428, 416, 414, 412, 410, 416, 428, 422]) to close the polygon. The resulting point array defines the corners of a single fill polygon to be filled by the fill module 224. It should be understood that various algorithms can be used to define the polygon 406 and the above is an example of one such algorithm. In some embodiments, the crop module 222 extends the fill polygon to slightly overlap with image 402. This extension provides for better coverage of the empty area, as there may be a slight line detectable when the fill polygon does not overlap the image 402.

Figure 5:
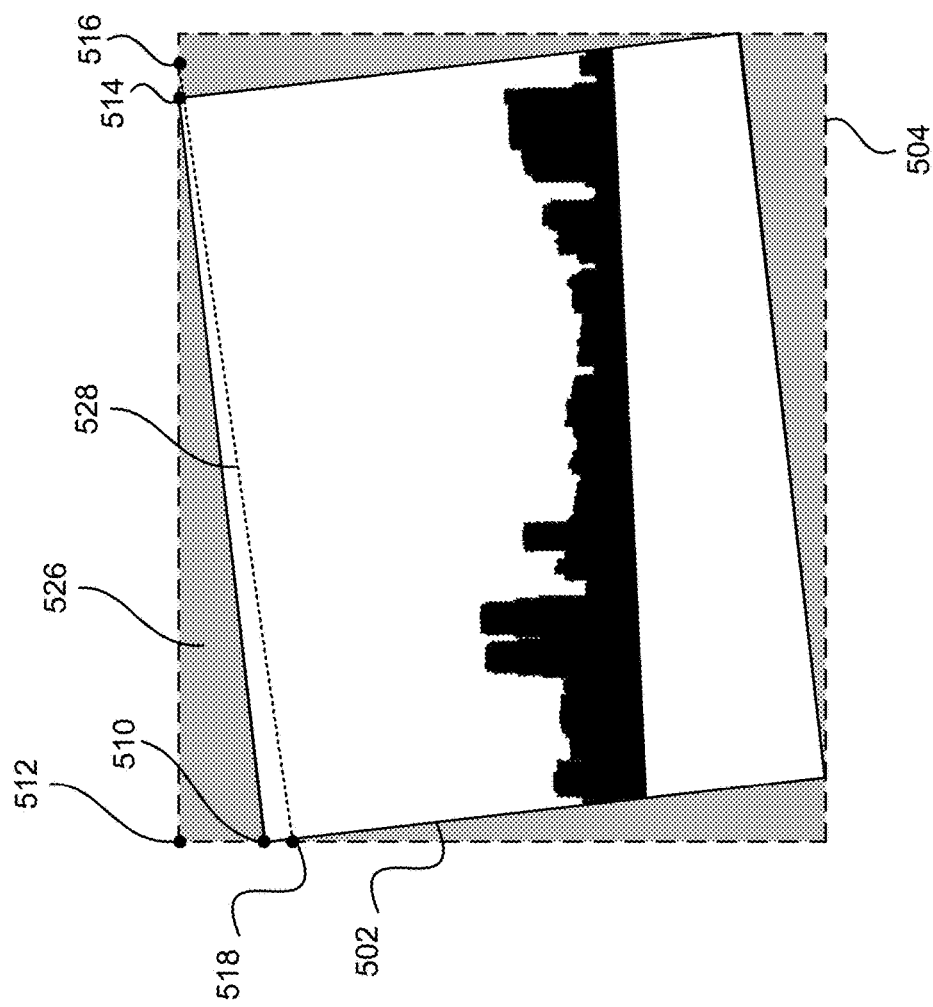
FIG. 5 is an example diagram depicting a fill on rotate operation where the corners of the image lie on the frame according to embodiments of the techniques disclosed herein.

FIG. 5 is an example diagram depicting a fill on rotate operation where the corners of the image 502 lie on the frame 504. This may happen, for example, in an embodiment where the frame 504 is automatically determined by the image editing application 210 and displayed to the user in user interface 212 as the user rotates the image 502. This relationship between image 502 and frame 504 (i.e., points of the image on the frame) is problematic when a general clipping algorithms is used to define the empty areas between the image 502 and the frame 504.

To overcome this issue, the disclosed techniques introduce an algorithm that the crop module 222 uses to generate the empty areas between the image 502 and the frame 504 to be filled by the content aware fill operation. Referring to the example of FIG. 5, while only a single polygon generation is explained, it should be understood that the same algorithm may be applied to each of the four corners between image 502 and frame 504 to generate four polygons to be filled using the content aware fill operation. In some embodiments, the crop module 222 determines a first location and an order (e.g., clockwise, counterclockwise, etc.) for adding subsequent locations from the image 502 and the frame 504 to a point array defining the polygon for filling with the content aware fill operations. For example, if the user rotates the image 502 to a negative angle (e.g., as depicted in the example of FIG. 5), the crop module 222 selects corner 510 of image 502 as the starting point and adds the location of corner 510 to the point array. The crop module 222 continues around the polygon in a clockwise manner by adding corner 512 of frame 504 and corner 514 of image 502 to the point array. To close the polygon, the crop module 222 adds corner 510 of image 502 to the polygon array again. The fill module 224 may then use the polygon array (e.g., [510, 512, 514, 510]) to apply the content aware fill operation to generate pixels to fill the triangle 526 using pixels from image 502.

In some embodiments, the crop module 222 extends the fill polygon to slightly overlap with the image 502. This extension provides for better coverage of the empty area, as there may be a slight line detectable when the fill polygon 526 does not overlap the image 502. In some embodiments, the overlap is a function of the size of image 502. For example, the overlap may be computed based on the following formula:

max(log($\sqrt{\text{cropWidth} \times \text{cropHeight}} \times 5-18$),5)

where cropWidth and cropHeight are the width and height of the frame 504, respectively, measured in pixels. Thus, using the example equation, a maximum overlap will be added to the fill polygon depending on the size of the frame 504. In other embodiments, the overlap can be a set number of pixels, or other fixed distance. However the overlap is calculated, the crop module 222 uses an offset based on the overlap to extend the fill polygon 526 over the image 502. For example, as the crop module 222 steps around the fill polygon storing locations in the point array, the crop module adds an offset to corner 514 and corner 510 to extend the fill polygon. The crop module 222 begins, as described above, by storing corner 510 of the image 502, corner 512 of frame 504, and corner 514 of image 502 in the point array. At this point, the crop module 222 adds the offset to the location of corner 514 of image 502 resulting in a new point 516 on frame 504. The crop module adds the location of point 516 on frame 504 to the point array. The crop module 222 then adds the offset to the location of corner 510 resulting in another new point 518 on frame 504. The crop module 222 adds the location of point 518 to the point array and closes the polygon by adding the location of corner 510 again to the point array. The point array (e.g., [510, 512, 514, 516, 518, 510]) may then be used by the fill module 224 to apply a content aware fill operation to generate pixels to fill the triangle 526, extended to the line 528 by the addition of the overlap, using pixels from image 502. In some embodiments, the crop module 222 omits the location of corners 510 and 514 of the image 502 from the point array (e.g., [518, 512, 516, 518]).

The following code is an example algorithm applied by the cropping module for determining fill polygons for an image that is tracked by the frame as the user rotates the image. In the following pseudo-code, R represents corners of the image and B represents corners of the frame. The routine nextPoint(i, R) refers to the i'th+1 point on the rectangle. If i is 3, then next point return 0 (i.e., nextPoint(i, R) R[(i+1) mod 4]). Conversely, prevPoint(i, R) returns R[i−1] unless i=0, then it returns R[3]. The normalize function computes the normalized vector of a point (e.g., $$\left[ \frac{x}{x^2+y^2}, \frac{y}{x^2+y^2} \right]).$$

```
for (i = 0; i < 4; ++i)
{
    if (rotationAngle > 0)
    {
        R[1].X += 1.0;
        R[2].Y += 1.0;
        var offsetVector = (nextPoint( i, R ) − R[i]).normalize( ) *
          overlap;
        var selPoints = [ prevPoint( i, R ), B[i], R[i],
                          R[i] + offsetVector,
                          prevPoint( i, R ) + offsetVector,
                          prevPoint( i, R ) ];
    }
    else
    {
        R[2].X += 1.0;
        R[3].Y += 1.0;
        var offsetVector = (prevPoint( i, R ) − R[i] ).normalize( ) *
          overlap;
        var selPoints = [ R[i], B[i], nextPoint( i, R ),
                          nextPoint( i, R ) + offsetVector,
                          R[i] + offsetVector, R[i] ];
    }
    ContentAwareFillPolygon( selPoints, i > 0 );
}
```

Figure 6:
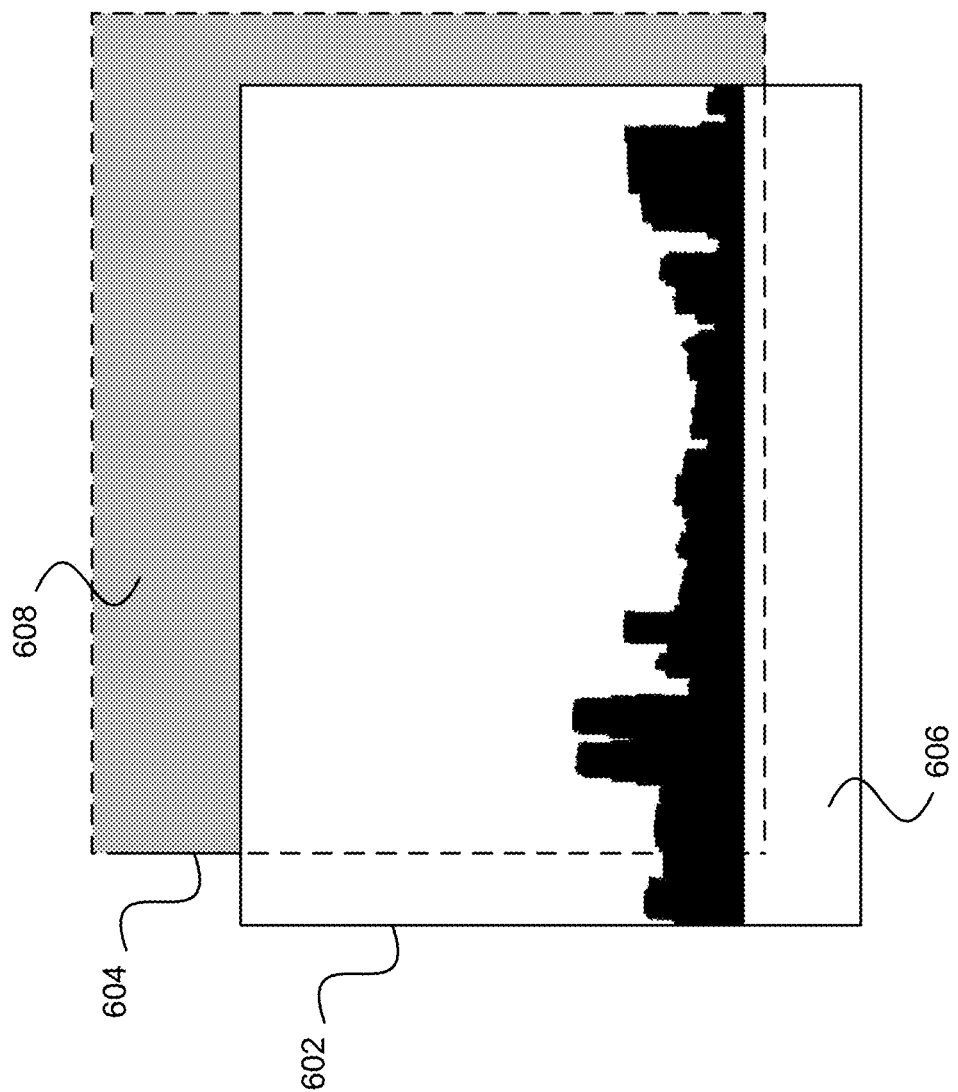
FIG. 6 is an example diagram depicting a crop and fill operation where the edges of the image and the frame may be coincident according to embodiments of the techniques disclosed herein.

FIG. 6 is an example diagram depicting a crop and fill operation where the edges of the image 602 and the frame 604 may be coincident. This is another case that is not handled well by a general clipping algorithm that may be used to define crop and fill polygons to generate a final image in the frame 604. The disclosed techniques include a coincident frame clipping algorithm designed for the crop module 222 to use in the case that the image 602 and the frame 604 are coincident. The crop module 222 uses the coincident frame clipping algorithm to crop the portion 606 of image 602 that falls outside of frame 604 and to generate a fill polygon corresponding to empty area 608 between frame 604 and image 602. The fill module 224 uses the fill polygon to apply a content aware algorithm to fill empty area 608 with pixels from image 602. The coincident frame clipping algorithm is described in detail below with reference to FIG. 7.

Figure 7:
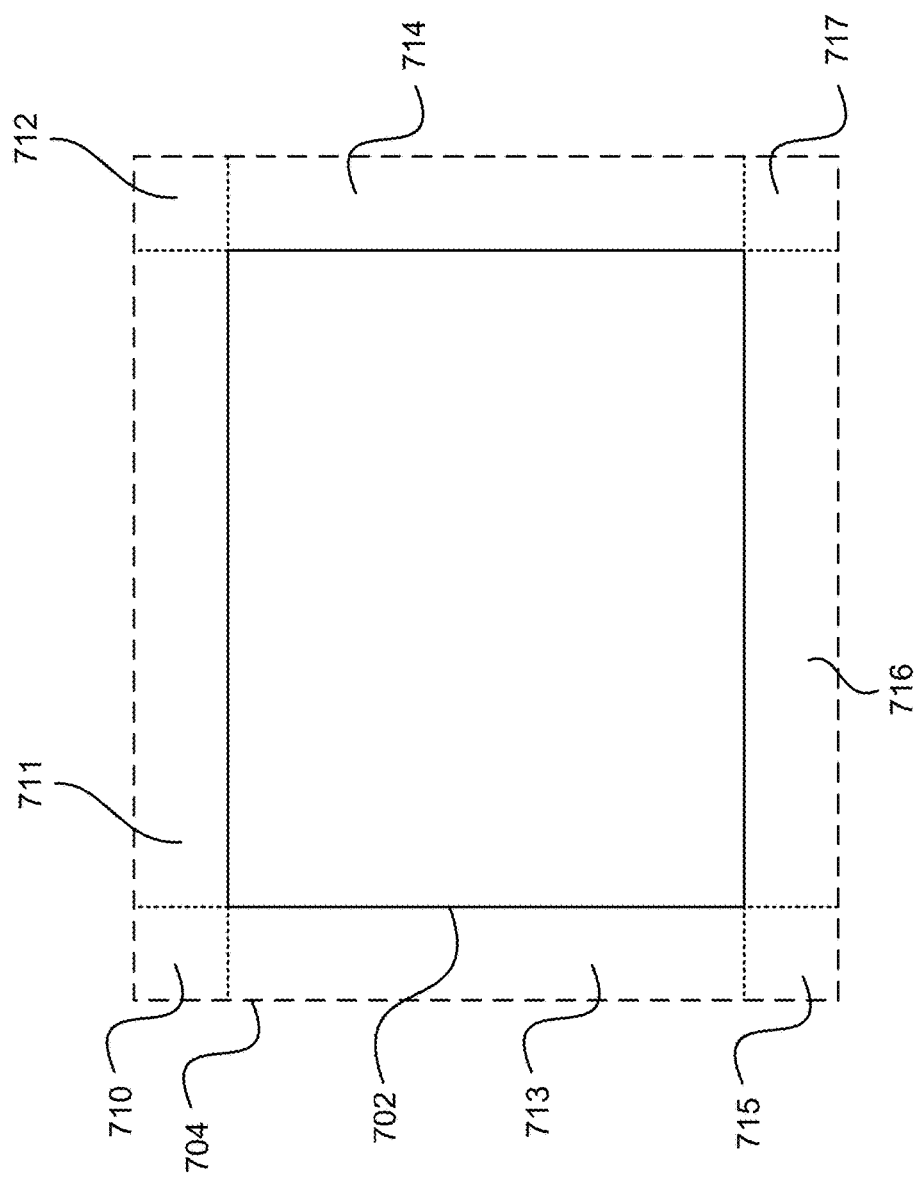
FIG. 7 is a block diagram depicting a general case of a coincident frame clipping algorithm according to embodiments of the techniques disclosed herein.

FIG. 7 is a block diagram depicting a general case of a coincident frame clipping algorithm. The coincident frame clipping algorithm is described with reference to the general case depicted in FIG. 7. As depicted in the example of FIG. 7, image 702 is completely inside of frame 704. The result is eight rectangle pieces (710-717) that can be used to generate a fill polygon surrounding image 702. It should be understood that fewer rectangle pieces will be used to generate the fill polygon if image 702 is not completely contained within frame 704 (e.g., as depicted in the example of FIG. 6).

At the outset, the crop module 222 determines the relationship between image 702 and frame 704. For example, the crop module 222 determines whether frame 704 is completely within image 702, in which case the crop module crops image 702 along the frame 704. In another example, the crop module 222 determines whether image 702 is completely within frame 704, in which case the crop module applies the algorithm as described above with reference to FIG. 4 to generate a fill polygon.

After determining that image 702 is not entirely within or containing frame 704, the algorithm compares the location of the edges of image 702 and frame 704 to determine which portions of frame 704 extend beyond the edges of image 702. For example, the crop module 222 compares the location of the top edge of image 702 and frame 704 to determine which is higher. The result may be stored as a true/false indication (e.g., 0/1) and is used in later calculations to determine what rectangle pieces correspond to image 702 extending beyond frame 704. A similar comparison is made for the left edge, right edge, and bottom edge of the image 702 and frame 704. In one embodiment, the crop module 222 determines that a comparison is true when an edge of image 702 extends beyond a corresponding edge of frame 704. However, in other embodiments, the opposite designation may be made.

Based on the comparison of the edges, the crop module 222 identifies which rectangle pieces of image 702 extend beyond frame 704. For rectangle pieces 711, 713, 714, and 716, the crop module 222 uses the true/false indication of frame 704 extending beyond image 702 for the top edge, left edge, right edge, and bottom edge, respectively, as an indication of whether the rectangle piece should be included as a fill polygon or portion of a fill polygon (e.g., a true indication corresponds to frame 704 extending beyond image 702 for that rectangle piece). For the corner rectangle pieces, the crop module 222 performs an AND operation on left edge or right edge and top edge or bottom edge true/false indications corresponding to a corner rectangle piece. For example, for the top left rectangle piece 710, the crop module 222 performs an AND operation on the left edge true/false indication and the top edge true/false indication to determine whether the top left rectangle piece 710 is an empty area and should be included as a fill polygon or a portion of a fill polygon. The AND operation indicates to crop module 222 that the corner rectangle piece 710 should be included as a fill polygon when both the top edge and left edge true/false indication is true (e.g., frame 704 extends to the left and top of image 702). The crop module 222 makes a similar determination for the remaining corner rectangle pieces and stores the state for each of the rectangle pieces for use in generating fill polygons.

To generate fill polygons, the crop module 222 starts with a side rectangle piece (e.g., 711, 713, 714, or 716) that has a true state (i.e., frame 704 extends beyond image 702) and determines whether a corner rectangle piece adjacent to the side rectangle piece also has a true state. If a corner rectangle piece adjacent to the side rectangle piece has a true state, the crop module 222 expands a fill polygon corresponding to the side rectangle piece to include the corner rectangle piece. For example, if both the top rectangle piece 711 and the top left corner rectangle piece 710 have a true state, the crop module 222 expands the fill polygon to include both the top rectangle piece 711 and the top left corner rectangle piece 710. The process is repeated for each side rectangle piece until all corner rectangle pieces are either included or excluded from a fill polygon. In some embodiments, the crop module 222 determines if a corner rectangle piece is adjacent to two side pieces and expands the fill polygon to include both side rectangle pieces and the corner rectangle piece in a single fill polygon.

The fill module 224 then uses one or more fill polygons generated by crop module 222 to apply a content aware fill operation to generate pixels to fill the one or more fill polygons using pixels from image 702. In some embodiments, the crop module 222 extends the fill polygon to slightly overlap with image 702. This extension provides for better coverage of the empty area, as there may be a slight line detectable when the fill polygon does not overlap the image 702.

The following code is an example algorithm applied by the crop module 222 for determining fill polygons using rectangle pieces for an image using a coincident frame clipping algorithm. It should be apparent that other algorithms or code can be used to implement the algorithm generally described above and the following is an example of one algorithm.

```
Rect.subtract = function( image )
{
    if (image.contains( frame ) || !image.intersects( frame ))
        return null;
    var self = frame;
    var topLT = frame.top < image.top;
    var leftLT = frame.left < image.left;
    var rightGT = frame.right > image.right;
    var bottomGT = frame.bottom > image.bottom;
    var tileState =  [ leftLT && topLT,    topLT,      rightGT && topLT,
        leftLT,                                         rightGT,
        leftLT && bottomGT, bottomGT,       rightGT &&
                                                        bottomGT];
    var tileUsed = [false, false, false, false, false, false, false, false];
    var resultRects = [ ];
    function extendRect( tileRect, tileNum, side )
    {
        if (tileState[tileNum] && !tileUsed[tileNum])
        {
            tileUsed[tileNum] = true;
            tileRect[side] = self[side];
        }
    }
    function makeAndExpandSide( sideNum, frameSide, frameDst,
                                c1Num, c1Side, c2Num, c2Side )
    {
        if (tileState[sideNum])
        {
            tileUsed[sideNum] = true;
            var newTile=new Rect( image.left, image.top, image.right,
                                image.bottom );
            newTile[frameSide] = self[frameSide];
            newTile[frameDst] = image[frameSide];
            if (! tileState[c1Num]) newTile[c1Side] = self[c1Side];
            if (! tileState[c2Num]) newTile[c2Side] = self[c2Side];
            extendRect( newTile, c1Num, c1Side );
```

-continued

```
        extendRect( newTile, c2Num, c2Side );
        resultRects.push( newTile );
      }
    }
  }
  makeAndExpandSide( 1, "top", "bottom", 0, "left", 2, "right" );
  makeAndExpandSide( 3, "left", "right", 0, "top", 5, "bottom" );
  makeAndExpandSide( 4, "right", "left", 2, "top", 7, "bottom" );
  makeAndExpandSide( 6, "bottom", "top", 5, "left", 7, "right" );
  return resultRects;
};
```

Figure 8:
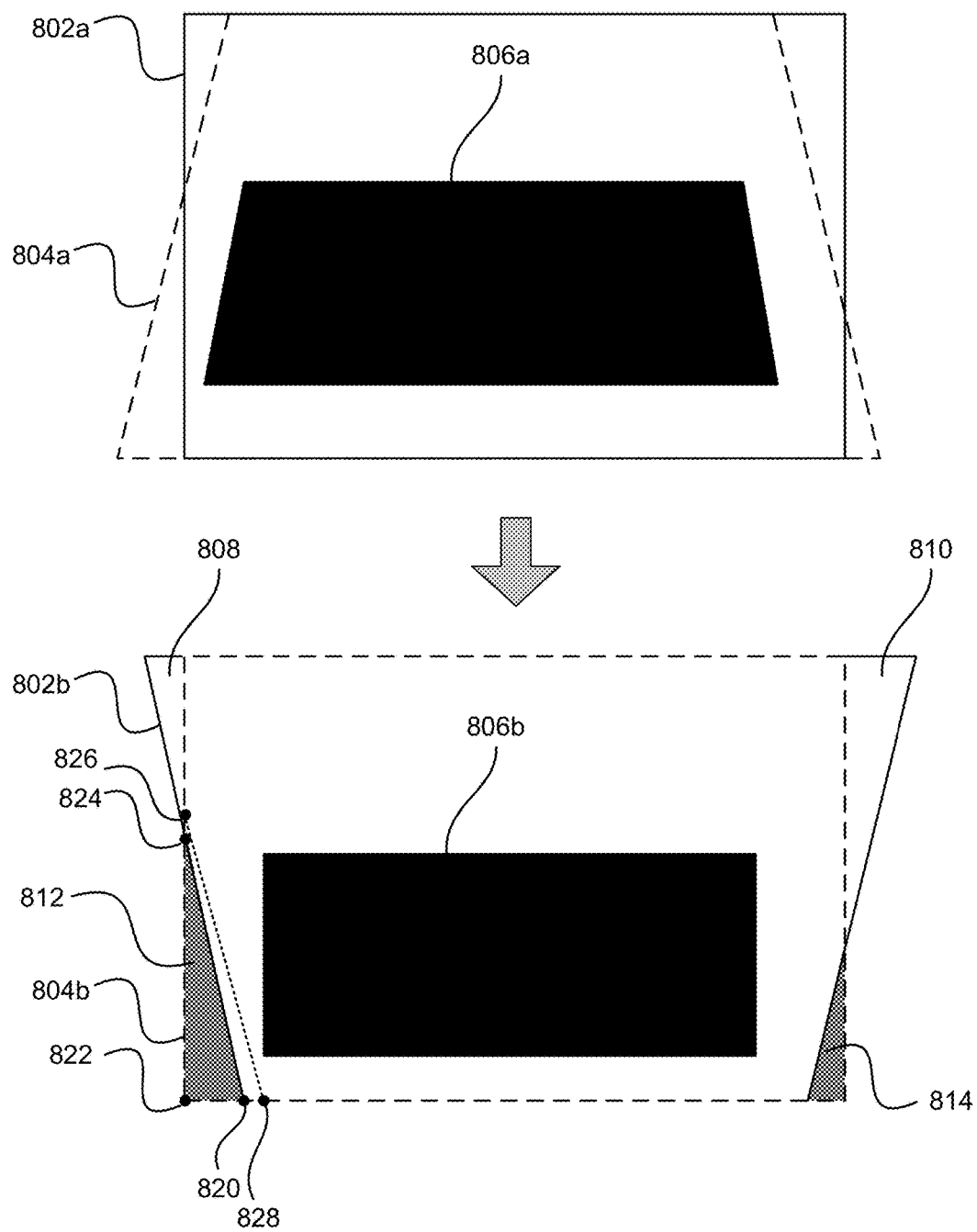
FIG. 8 is an example diagram depicting an auto fill operation when a user corrects perspective distortion in image editing application according to embodiments of the techniques disclosed herein.

FIG. 8 is an example diagram depicting an auto fill operation when a user corrects perspective distortion in image editing application 210. The example of FIG. 8 includes an image 802a captured by a user with the camera held at an angle that introduced perspective distortion into the image (e.g., as indicated by the keystone shape of object 806a). To correct the perspective distortion in image 802a, the user loads image 802 into image editing application 210 and manipulates image 802a using user interface 212 of the image editing application 210 such that the perspective distortion is corrected (e.g., as indicated by the rectangle shape of object 806b in image 802b). As the user manipulate image 802a, user interface 212 generates a frame 804a, that defines the extents of a final image. When the user is satisfied with the perspective distortion correction (e.g., the user selects a "fill" option, stops manipulating the image, etc.), the image editing application 210 uses a content aware fill operation to generate the final image by filling in the empty areas 812 and 814 created between image 802b and frame 804b and cropping portions 808 and 810 of image 802b that fall outside of frame 804b.

In some embodiments, the crop module 222 generates a fill polygon for the empty areas 812 and 814 using an algorithm similar to that discussed above with reference to FIG. 5. For example, in one embodiment, the crop module 222 selects corner 820 of image 802b as the starting point and adds the location of corner 820 to a point array defining the fill polygon corresponding to empty area 812. The crop module 222 continues around the polygon in a clockwise manner by adding corner 822 of frame 804b and intersection 824 of image 802b and frame 804b to the point array. To close the polygon, the crop module 222 adds corner 820 of image 802b to the polygon array again. The fill module 224 may then use polygon array (e.g., [820, 822, 824, 820]) to perform a content aware fill operation to generate pixels to fill the empty area 812 using pixels from image 802b.

In some embodiments, the crop module 222 extends the fill polygon to slightly overlap with the image 802b, similar to the process described above with reference to FIG. 5. The fill module 224 uses the point array (e.g., [820, 822, 824, 826, 828, 820]) generated using the extended polygon to perform a content aware fill operation to generate pixels to fill the polygon 812, extended to include the overlap, using pixels from image 802b.

Figure 9:
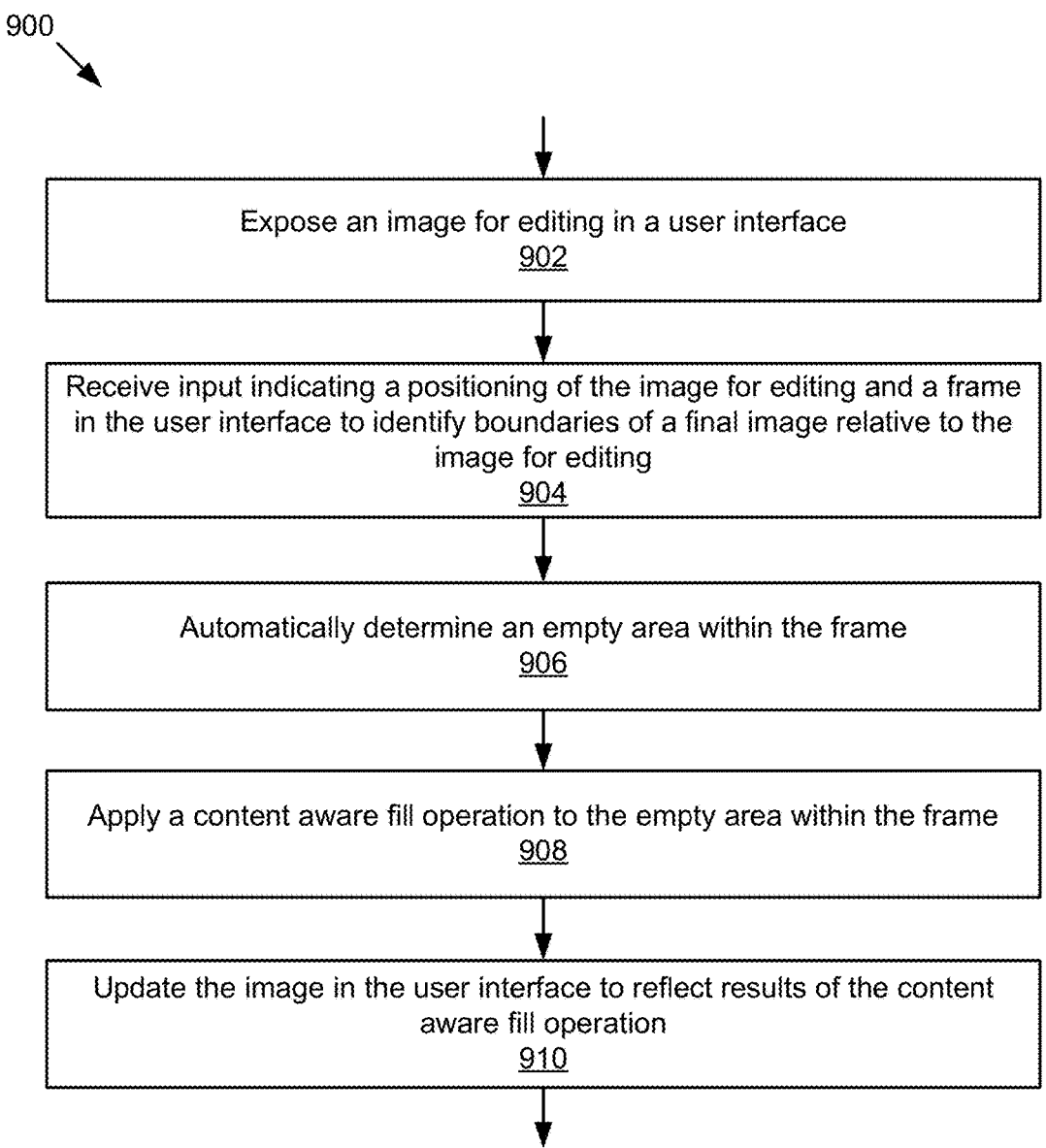
FIG. 9 is a flow chart illustrating an example method for applying an auto fill operation according to the disclosed techniques.

FIG. 9 is a flow chart illustrating an example method 900 for applying an auto fill operation according to the disclosed techniques. In some embodiments, the method 900 is executed/performed by a computing system as discussed below (e.g., system 1300). In some embodiments, the system is a personal computer, mobile computing device, or the like with a local processor and memory that performs the image editing functions described herein. In other embodiments, the system is a cloud computing system, or the like, that performs the image editing functions described herein while providing an interface to a personal computer or mobile device. At 902, the system exposes an image for editing in a user interface. For example, in one embodiment, an image editing application 210 executed by a local processor generates a user interface 212 to display the image for editing to the user. In another embodiment, an image editing application 210, running on a cloud computing system is accessed by a user via a web browser, thin client, or the like, provides a user interface 212 to display the image for editing to the user.

At 904, the image editing application 210 receives input indicating a positioning of the image for editing and a frame in the user interface to identify boundaries of a final image relative to the image for editing. In one embodiment, the input by the user is to rotate the image, crop the image, and/or correct perspective distortion as discussed above. In some embodiments, the image editing application 210 automatically positions the frame in the user interface 212 based on the location and orientation of the image. At 906, the crop module 222 automatically determines an empty area within the frame. For example, the crop module 222 uses one or more of the algorithms discussed above to identify an empty area within the frame and to generate a fill polygon corresponding to the empty area.

At 908, the fill module 224 applies a content aware fill operation to the empty area within the frame. For example, the fill module 224, using the content aware fill operation, uses pixels from the image and coordinates of the fill polygon corresponding to the empty area to fill the empty area with pixels from the image. At 910, the image editing application 210 updates the image in the user interface 212 to reflect results of the content aware fill operation. In some embodiments, the image editing application can dynamically update the image in the user interface 212 to reflect changes to the position or orientation of the image made by the user. In other embodiments, the image editing application 210 waits for an input via user interface 212 (e.g., apply) to indicate that the user is ready for the content aware fill operation to be performed.

Figure 10:
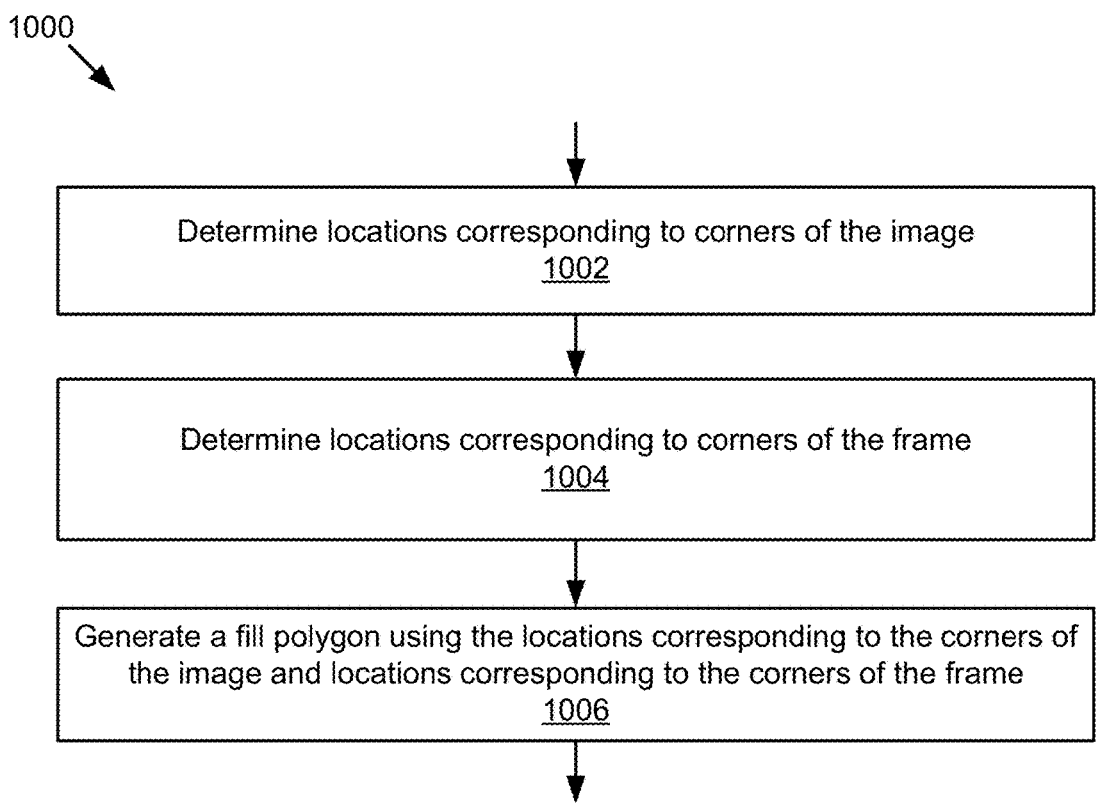
FIG. 10 is a flow chart illustrating an example method for automatically determining an empty area within the frame according to the disclosed techniques.

FIG. 10 is a flow chart illustrating an example method 1000 for automatically determining an empty area within the frame according to the disclosed techniques. In one embodiment, the image editing application 210 may use the example method 1000 when an image is completely contained within a frame as positioned by a user in user interface 212. At 1002, the crop module 222 determines locations corresponding to corners of the image and, at 1004, determines locations corresponding to corners of the frame. At 1006, the crop module 222 generates a fill polygon using the locations corresponding to the corners of the image and locations corresponding to the corners of the frame. For example, in one embodiment, the crop module 222 uses the algorithm described above with reference to FIG. 4 to generate the fill polygon using the locations corresponding to the corners of the image and corner of the frame.

Figure 11:
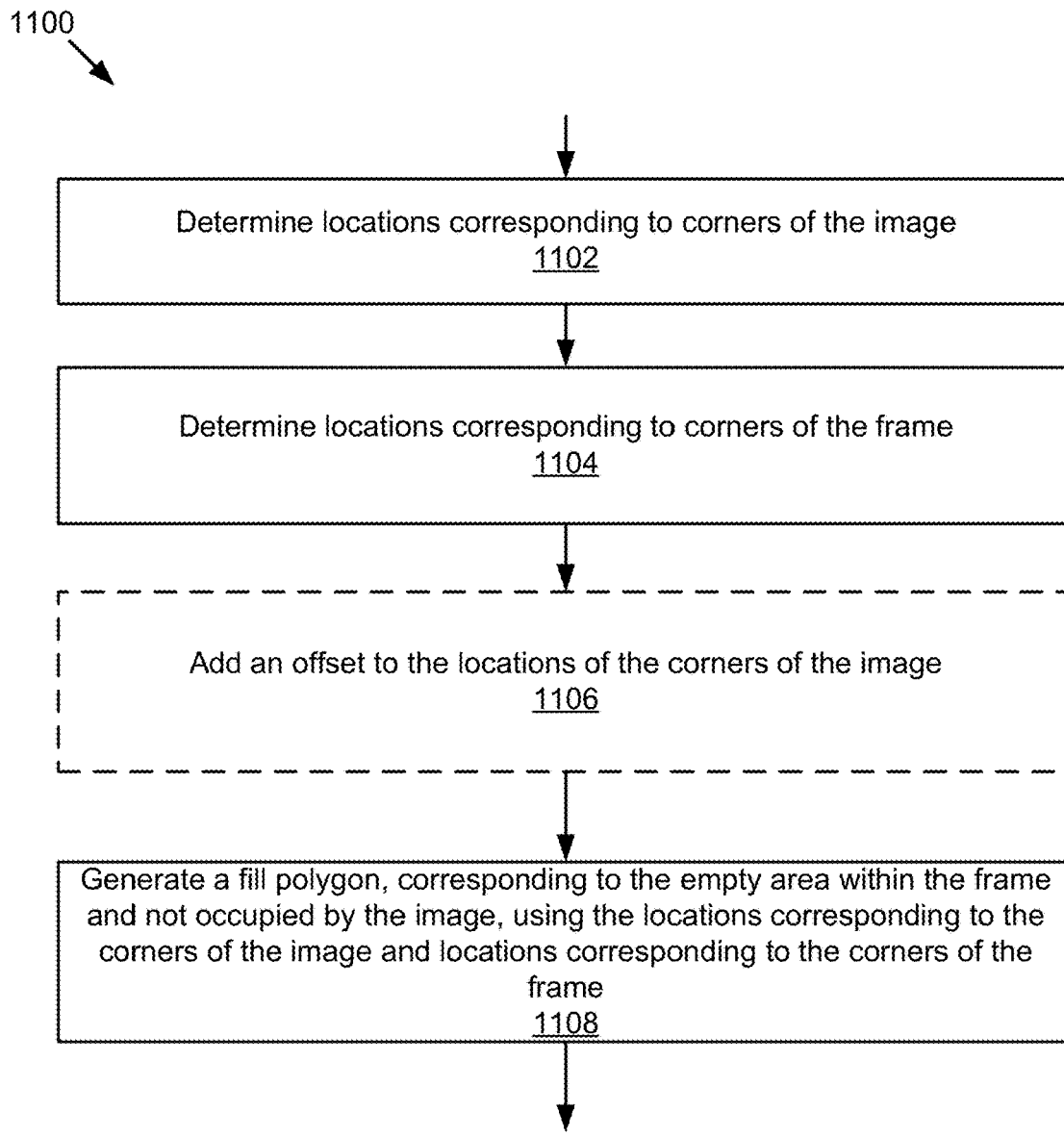
FIG. 11 is a flow chart illustrating an example method for automatically determining an empty area within the frame according to the disclosed techniques.

FIG. 11 is a flow chart illustrating an example method 1100 for automatically determining an empty area within the frame according to the disclosed techniques. In one embodiment, the image editing application 210 may use the example method 1100 when a frame tracks the corners of an image. At 1102, the crop module 222 determines locations corresponding to corners of the image and, at 1104, determines locations corresponding to corners of the frame. At 1106, in some embodiments, the crop module 222 adds an offset to the locations of the corners of the image. As described above, the offset provides for better coverage of the empty area. At 1108, the crop module 222 generates a fill polygon, corresponding to the empty area within the frame and not occupied by the image, using the locations corresponding to the corners of the image and locations corresponding to the corners of the frame. In some embodiments, the crop module 222 generates the fill polygon, corresponding to the empty area, using the locations corresponding to the corners of the image, the locations corresponding to the corners of the frame, and the offset to the locations of the corners of the image. In some embodiments, the image editing application repeats the method 1100 to generate fill polygons for all empty areas between the image and the frame.

Figure 12:
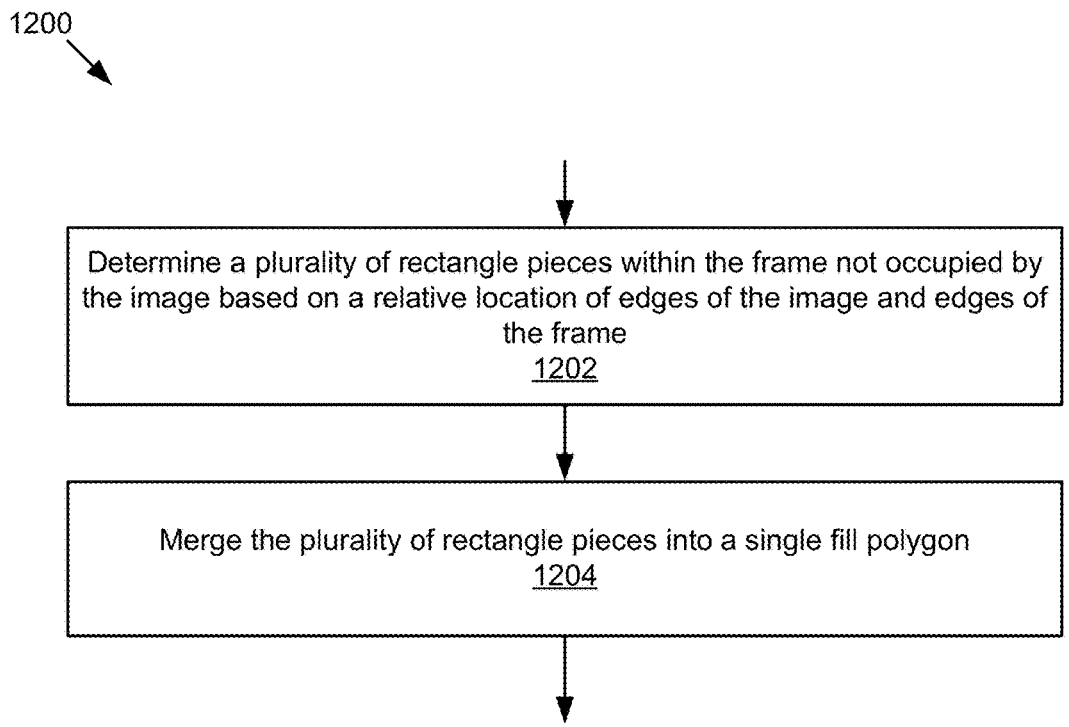
FIG. 12 is a flow chart illustrating an example method for automatically determining an empty area within the frame according to the disclosed techniques.

FIG. 12 is a flow chart illustrating an example method 1100 for automatically determining an empty area within the frame according to the disclosed techniques. In one embodiment, the image editing application 210 may use the example method 1200 when a frame may be coincident with an edge of an image. At 1202, the crop module 222 determines a plurality of rectangle pieces within the frame not occupied by the image, based on a relative location of edges of the image and edges of the frame. At 1204, the crop module 222 merges the plurality of rectangle pieces into a single fill polygon.

Figure 13:
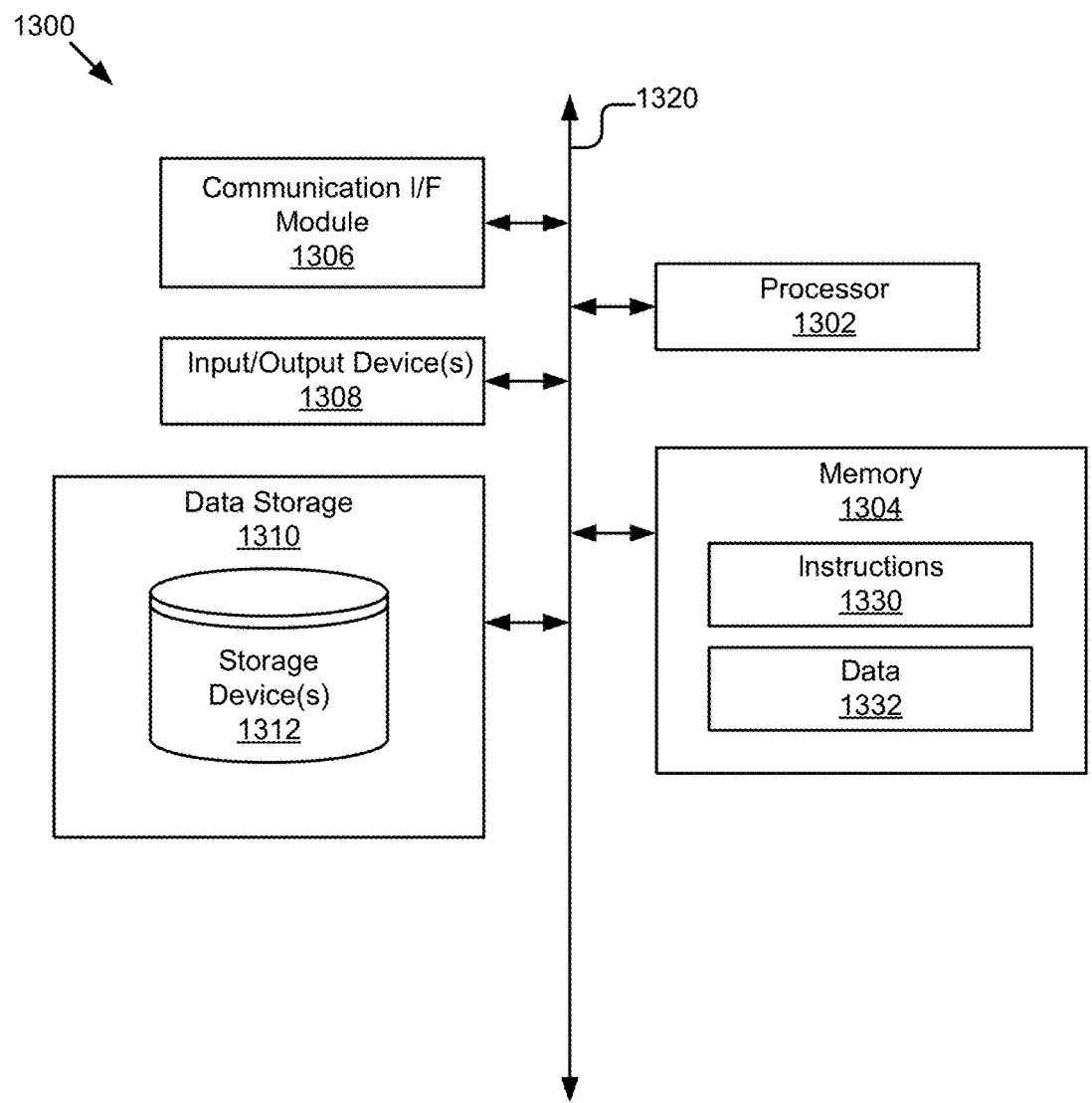
FIG. 13 is a block diagram illustrating one embodiment of a computing device suitable for implementing the techniques and methods described herein.

Any suitable computing system or group of computing systems can be used to implement the techniques and methods described herein. For example, as described above, an image editing application exposes an image for editing to a user, generates fill polygons corresponding to empty areas between a frame and an image, and applies a content aware fill operation to fill the empty areas with pixels from the image. FIG. 13 is a block diagram illustrating one embodiment of a computing device (e.g., personal computer, mobile device, cloud computing system, etc.) 1300 suitable for implementing the techniques and methods described herein. The computing device 1300 may include a processor 1302, a memory 1304, a communication interface module 1306, input/output device(s) 1308, and data storage 1310 according to some examples. The components of the computing device 1300 are communicatively coupled by a bus or software communication mechanism 1320. The bus 1320 may represent one or more buses including an industry standard architecture (ISA) bus, a peripheral component interconnect (PCI) bus, a universal serial bus (USB), or some other bus known in the art to provide similar functionality.

The processor 1302 may execute software instructions by performing various input/output, logical, and/or mathematical operations. The processor 1302 may be physical and/or virtual, and may include a single processing unit or a plurality of processing units and/or cores. The processor 1302 may comprise a microprocessor, an application specific integrated circuit, a state machine, or other processing device. In some implementations, the processor 1302 may be coupled to the memory 1304 via the bus 1320 to access data and instructions therefrom and store data therein. The bus 1320 may couple the processor 1302 to the other components of the computing device 1300 including, for example, the memory 1304, the communication interface module 1306, and the data storage 1310. It will be apparent that other processors, operating systems, sensors, displays, and physical configurations are possible.

The memory 1304 may store and provide access to data for the other components of the computing device 1300. The memory 1304 may be included in a single computing device or distributed among a plurality of computing devices. In some implementations, the memory 1304 may store instructions 1330 that may be executed by the processor 1302 and/or data 1332 that may be manipulated by the processor 1302. The instructions 1330 may include code for performing the techniques described herein. The memory 1304 is also capable of storing other instructions and data, including, for example, an operating system, hardware drivers, other software applications, databases, etc. The memory 1304 may be coupled to the bus 1320 for communication with the processor 1302 and the other components of the computing device 1300.

The memory 1304 may include one or more non-transitory computer-usable (e.g., readable, writeable) devices, for example, a dynamic random access memory (DRAM) device, a static random access memory (SRAM) device, an embedded memory device, a discrete memory device (e.g., a PROM, EPROM, ROM), a hard disk drive, an optical disk drive (e.g., CD, DVD), or the like, which can be any tangible apparatus or device that can contains, stores, communicates, or transports instructions, data, computer programs, software, code, routines, etc., for processing by, or in connection with, the processor 1302. In some implementations, the memory 1304 may include one or more of volatile memory and non-volatile memory. It should be understood that the memory 1304 may be a single device or may include multiple types of devices and configurations.

The communication interface module 1306 is hardware and/or software for receiving and transmitting data by linking the processor 1302 to a network or other processing systems. The communication interface module 1306 may receive data and/or instructions and transmit the data and/or instructions to the processor 1302 for execution. In one embodiment, the communication interface module 1306 may include a port for direct physical connection to a communication channel. The communication interface module 1306 may also or alternatively include a wireless transceiver for transmitting and receiving instructions and/or data using one or more wireless communication methods, such as IEEE 802.11, IEEE 802.16, Bluetooth®, or another suitable wireless communication method.

The input/output device(s) 1308 may be internal or external devices that facilitate communication between the computing device 1300 and a human user. For example, the input/output devices may include a keyboard, touchscreen display, microphone, speakers, etc.

The data storage 1310 may include storage device(s) 1312 that provide a non-transitory memory to store data for providing the functionality described herein. In some embodiments, the storage device(s) 1312 may include a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information.

In the above description, for purposes of explanation, numerous specific details are set forth in order to provide a thorough understanding of the techniques introduced above. It will be apparent, however, to one skilled in the art that the techniques can be practiced without these specific details. In other instances, structures and devices are shown in block diagram form in order to avoid obscuring the description and for ease of understanding.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
   exposing an image for editing in a user interface of a computing device, wherein at least a portion of the image is offset at an angle relative to a horizon line;
   receiving input indicating a positioning of the image in the user interface, wherein the positioning includes rotating the image to be in alignment with the horizon line within the image;
   generating a frame in the user interface to identify boundaries of a final image relative to the image, the boundaries enclosing the rotated image;
   responsive to the input, determining, using the computing device, an empty area, within the frame between the rotated image and the boundaries;
   applying a fill operation to the empty area within the frame using the computing device, wherein the fill operation includes a content-aware fill operation in which synthesized image data assembled using a source region of the image is added to the empty area to extend content of the image into the empty area, wherein the content-aware fill operation includes executing a search of image pixels adjacent to the empty area, sampling a plurality of overlapping shapes from the adjacent image pixels, assigning the plurality of overlapping shapes to corresponding shapes within the empty area, and assigning colors to pixels within the empty area based on the corresponding shapes, to thereby obtain the synthesized image data; and
   updating the image in the user interface to generate the final image as including the synthesized image data and the rotated image.

2. The method of claim 1, wherein generating the frame in the user interface comprises automatically positioning the frame in response to a user rotating the image.

3. The method of claim 2, wherein automatically positioning the frame comprises automatically extending the frame as the image is rotated, such that corners of the image are coincident with the frame in the user interface.

4. The method of claim 1, wherein determining the empty area within the frame comprises:
   determining locations corresponding to corners of the image;
   determining locations corresponding to corners of the frame; and
   generating a fill polygon using the locations corresponding to the corners of the image and locations corresponding to the corners of the frame.

5. The method of claim 1, wherein determining the empty area within the frame comprises:
   determining locations corresponding to corners of the image;
   determining locations corresponding to corners of the frame; and
   generating a fill polygon, corresponding to the empty area within the frame and not occupied by the image, using the locations corresponding to the corners of the image and locations corresponding to the corners of the frame.

6. The method of claim 1, wherein determining the empty area within the frame comprises:
   determining a plurality of rectangle pieces within the frame not occupied by the image based on a relative location of edges of the image and edges of the frame; and
   merging the plurality of rectangle pieces into a fill polygon.

7. The method of claim 1, wherein the user interface corresponds to an image editing application configured to provide tools for editing images.

8. A system comprising;
   one or more processors; and
   a memory, the memory storing instructions, which when executed cause the one or more processors to:
   expose an image for editing in a user interface of a computing device, wherein at least a portion of the image is offset at an angle relative to a horizon line;
   receive input indicating a positioning of the image in the user interface, wherein the positioning includes rotating the image to be in alignment with the horizon line within the image;
   generate a frame in the user interface to identify boundaries of a final image relative to the image, the boundaries enclosing the rotated image;
   responsive to the input, determining, using the computing device, an empty area within the frame between the rotated image and the boundaries, the empty area overlapping the image;
   apply a fill operation to the empty area within the frame using the computing device, wherein the fill operation includes a content-aware fill operation in which synthesized image data assembled using a source region of the image is added to the empty area to extend content of the image into the empty area, wherein the content-aware fill operation includes executing a search of image pixels adjacent to the empty area, sampling a plurality of overlapping shapes from the adjacent image pixels, assigning the plurality of overlapping shapes to corresponding shapes within the empty area, and assigning colors to pixels within the empty area based on the corresponding shapes, to thereby obtain the synthesized image data; and update the image in the user interface to generate the final image as including the synthesized image data and the rotated image.

9. The system of claim 8, wherein to generate the frame in the user interface, the instructions cause the one or more processors to automatically position the frame in response to a user rotating the image.

10. The system of claim 9, wherein to automatically position the frame, the instructions cause the one or more processors to automatically extend the frame as the image is rotated, such that corners of the image are coincident with the frame in the user interface.

11. The system of claim 8, wherein to determine the empty area within the frame, the instructions cause the one or more processors to:

determine locations corresponding to corners of the image;

determine locations corresponding to corners of the frame; and generate a fill polygon using the locations corresponding to the corners of the image and locations corresponding to the corners of the frame.

12. The system of claim 8, wherein to determine the empty area within the frame, the instructions cause the one or more processors to:

determine locations corresponding to corners of the image;

determine locations corresponding to corners of the frame; and generate a fill polygon, corresponding to the empty area within the frame and not occupied by the image, using the locations corresponding to the corners of the image and locations corresponding to the corners of the frame.

13. The system of claim 8, wherein to determine the empty area within the frame, the instructions cause the one or more processors to:

determine locations of edges of the image;
determine locations of edges of the frame; and
determine a plurality of rectangle pieces within the frame not occupied by the image based on a relative location of edges of the image and edges of the frame; and
merge the plurality of rectangle pieces into a fill polygon.

14. The system of claim 8, wherein the user interface corresponds to an image editing application configured to provide tools for editing images.

15. A non-transitory computer readable medium storing instructions which, when executed by a computer, cause the computer to perform operations comprising:

exposing an image for editing in a user interface of a computing device, wherein at least a portion of the image is offset at an angle relative to a horizon line;

receiving input indicating a positioning of the image in the user interface, wherein the positioning includes rotating the image to be in alignment with the horizon line within the image;

generating a frame in the user interface to identify boundaries of a final image relative to the image, the boundaries enclosing the rotated image;

responsive to the input, identifying, using the computing device, a polygon within the frame, the polygon not occupied by the image, as an empty area within the frame between the rotated image and the boundaries;

applying a fill operation to the empty area within the frame using the computing device, wherein the fill operation includes a content-aware fill operation in which synthesized image data assembled using a source region of the image is added to the empty area to extend content of the image into the empty area, wherein the content-aware fill operation includes executing a search of image pixels adjacent to the empty area, sampling a plurality of overlapping shapes from the adjacent image pixels, assigning the plurality of overlapping shapes to corresponding shapes within the empty area, and assigning colors to pixels within the empty area based on the corresponding shapes, to thereby obtain the synthesized image data; and updating the image in the user interface to generate the final image as including the synthesized image data and the rotated image.

16. The computer readable medium of claim 15, wherein generating the frame in the user interface comprises automatically extending the frame in the user interface as the image is rotated, such that corners of the image are coincident with the frame in the user interface.

* * * * *